Aug. 7, 1934.  R. E. KELLER  1,969,561
TRANSMISSION MECHANISM
Filed Aug. 22, 1931
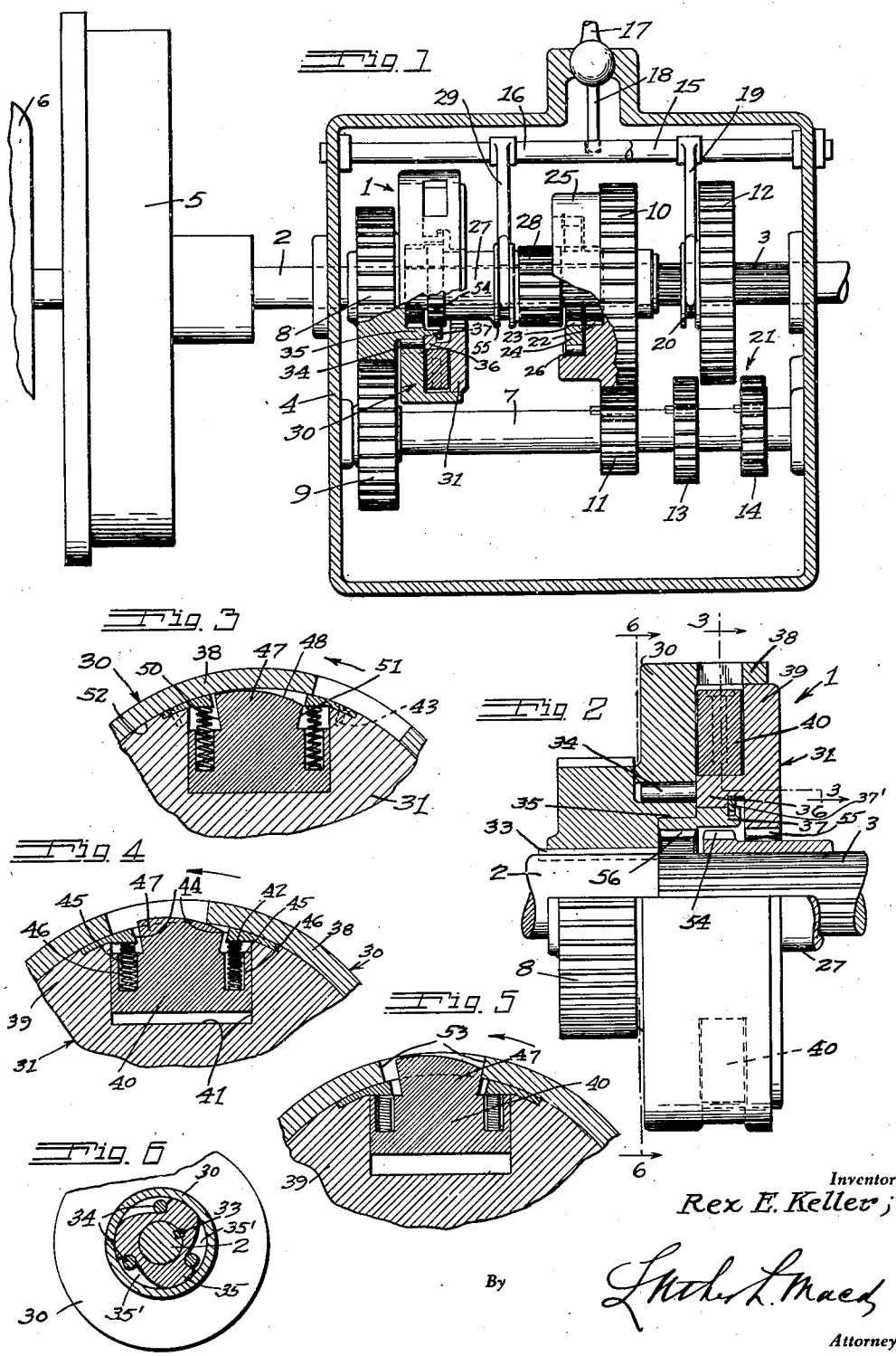
Inventor
Rex E. Keller;
By
Attorney Patented Aug. 7, 1934

1,969,561

UNITED STATES PATENT OFFICE 1,969,561

TRANSMISSION MECHANISM

Rex E. Keller, Los Angeles, Calif.

Application August 22, 1931, Serial No. 558,657

23 Claims. (Cl. 74—336)

This invention relates to transmission mechanisms, and particularly to a type of clutch or power transmitting device adapted to be incorporated in a transmission mechanism for operatively connecting a driving shaft with a driven shaft, and including centrifugally operable means which is automatically effective when the driven shaft attains a pre-determined speed for positively locking the driving and driven members together for synchronous rotation.

This invention contemplates the provision in a clutch of the character referred to of means such, for instance, as a beveled face on the centrifugally operable member which will prevent engagement of the clutch members while the driving member is rotating at a speed in excess of the speed of the driven member; and which may have a second beveled face which operatively engages and tends to lock the centrifugally operable member when the driven member tends to rotate at a speed in excess of the driving member, as in the case of a free wheeling device; and which will include a third beveled face which drives and prevents the centrifugally operable locking member from unlocking when power is being transmitted from the driving member to the driven member.

Another object is to provide in a transmission mechanism the combination with a transmission mechanism including forward and reverse gearing, a clutch of the character referred to operatively associated with said gearing for directly connecting a driving shaft with a driven shaft whereby, for instance, said clutch may be automatically operative when the driven shaft attains a predetermined speed thru the instrumentality of a second or intermediate forward gear train for directly connecting the driving and driven shafts and for rendering the second gear train ineffective.

A further object is to provide means intermediate the direct driven and intermediate gears for selectively connecting elements of the transmission at high and intermediate speeds for positive drive.

Other objects may appear as the description progresses.

I have shown a preferred form of my invention in the accompanying drawing, in which Fig. 1 is a sectional plan of a transmission mechanism embodying my improvements and which is operatively associated with the driving shaft of a motor.

Fig. 2 is a detached view of my improved direct drive clutch forming a part of the transmission mechanism and shown partly in section.

Figs. 3, 4 and 5 are fragmentary sections of the same on line 3—3 of Fig. 2 showing the centrifugally operable locking device incorporated in the clutch for connecting the driving and driven members of the clutch at different stages in the operation thereof.

Fig. 6 is a sectional view of the clutch on line 6—6 of Fig. 1.

My improvements consist primarily in the provision of an automatically operable clutch 1 for direct connecting a drive shaft 2 with a driven shaft 3 and mounted within a transmission case 4 of usual or special design. The shafts 2 and 3 are coaxially arranged in the transmission case 4, and the shaft 2 carries a fly wheel 5 adjacent a motor 6, by means of which power is applied to the driven shaft 3.

A counter-shaft 7 is provided within the transmission which is positively and continuously driven from the drive shaft 2 by means of gears 8 and 9 carried on the shafts 2 and 7 respectively. The shaft 7 is additionally connected with the driven shaft 3 by means of continuously meshing intermediate forward speed gears 10 and 11 which are, respectively, held in fixed positions on the shafts 3 and 7. The gear 10, however, is loosely mounted on the shaft 3 and gear 11 is keyed to shaft 7.

The shaft 3 carries a low speed gear 12 which is slidable on and is splined to the shaft 3 for selective connection with low and reverse driving gears 13 and 14 respectively which are spaced apart on and are keyed to the shaft 7. The splines of shaft 3 terminate at the side of gear 10 so that said gear is freely rotatable on said shaft.

The mechanism includes the well known form of gear shifting devices comprising parallel spaced rods 15 and 16 which are slidable in the top of the case 4 by means of a universally pivoted gear shift lever 17 having a depending arm 18 which selectively engages the rods 15 and 16 when the lever 17 is rocked laterally. As in other types of transmissions the rocking of the lever forwardly and backwardly serves to slide the rods 15 and 16 for changing the gear ratios and driving speeds of the transmission.

The rod 15 may have a depending fork 19 which engages a shift collar 20 on gear 12 so that when the rod 15 is longitudinally moved forwardly by lever 17 said gear will mesh with the low speed driving pinion 13 for imparting forward motion at low speed to the driven shaft 3. When gear 12 is reversely moved by lever 17 it will be meshed with an idler gear 21 suitably mounted in case 4 which is driven from gear 14 on counter shaft 7, thereby imparting reverse motion to shaft 3.

Gear 10 has internal teeth or splines 22 formed therein which are coaxial with and of the same size as similar teeth or splines 23 on a ring 24 which is mounted in and clutch-connected with an extension 25 of said gear by means of a series of rollers 26. Intermediate the clutch 1 and gear 10 the shaft 3 is provided with a shift collar 27 which is splined to said shaft and has a series of teeth or splines 28 annularly formed thereon adjacent the gear 10 for selectively meshing with the ring 24 or for simultaneously meshing with said ring and the splines 22 of gear 10.

The shift rod 16 carries a yoke 29 which engages a groove in the shift collar 27 whereby said collar may be shifted by means of the lever 17. The clutch 1 includes a driving member 30 and a driven member 31 which are co-axially mounted on the driving shaft 2, either in abutting or telescoping relation, and operatively associated with the driving shaft 2 and the driven shaft 3 respectively. Preferably the driving member 30 of the clutch is clutch connected with the driving gear 8 by means of a plurality of frictionally operable rollers 34 which are carried in eccentrically formed recesses 35' on the extension 35 of gear 8. Gear 8 is keyed to shaft 2 at 33.

The arrangement of the roller clutch shown in Figs. 2 and 6 is such that the rotation of shaft 2 in a given direction will serve to rotate the driving member 30 of the clutch in a corresponding direction, but said rollers permit the rotation of the member 30 at a speed in excess of the speed of shaft 2 when the driven member 31 of the clutch is operatively connected with the member 30, as hereinafter described.

As shown in Fig. 2, the rollers 34 operatively connect the extension 35 formed on the inner side of the driving gear 8 with the clutch member 30.

The driven member 31 of the clutch 1 is rotatably but loosely mounted on the driving gear 8, as shown in Fig. 2. To this end said member 31 has an outwardly extended annular portion 36 which telescopes an annular portion 37 which extends inwardly from the driving gear 8, and is so held by means of a locking ring 37'. The member 30 has an annular rim 38 which telescopes a flange 39 formed on member 31, as shown in Fig. 2.

One or more centrifugally operable locking members 40 may be provided either on the driving member 30 or the driven member 31 for operative connection with the other of said members, a pair of diametrically opposite members 40 being shown in the drawing as slidably supported in peripheral recesses 41 formed in the member 31, or said members may be otherwise mounted on the member 30 or 31 for centrifugal operation in order to lock said members together.

In the arrangement shown, however, the recesses 41 are open at the periphery of the member 31, but the ends thereof are closed by a plate 42 which is detachably secured to the member 31 by means of screws 43 or otherwise, said plate having an opening 44 therein.

The members 40 are urged inwardly into inoperative positions by means of springs 45, 45 which are mounted at opposite ends of said plate in recesses 46, 46 and are compressed between the overlapping portions of the plate 42 and the bottoms of the recesses 46, as shown in Figs. 3, 4 and 5. The bodies of the members 40 are substantially larger than the openings 44 in the plates 42 and said members 40 have reduced extensions 47 which project thru the openings 44.

Particular attention is called to the fact that the outer faces 48 of the extensions 47 are beveled, inclined or eccentrically formed relative to the axis of the member 31, and that the edges 50 and 51 of the extensions 47 are beveled inwardly from the extremities of the faces 48. Thus each of the members 40 is provided with an extension 47 which has three inclined or beveled surfaces for performing three separate and distinct functions in the operation of the clutch, as hereinafter explained. It will be noted that the surface 48 recedes from the inner periphery 52 of the flange 38 of member 30 in a direction reversely of the direction of rotation of the member 30.

The flange 38 of member 30 is provided with an aperture or recess 53 forming a seat or stop for the extension 47 of member 40, as shown in Fig. 5, while the members 30 and 31 are locked together for synchronous rotation. It will be understood that the members 40 are adapted to be moved outwardly against the tension of springs 45 by centrifugal force when the speed of the driven clutch member 31 is accelerated sufficiently to accomplish this purpose, and the springs 45 oppose centrifugal force in the operation of the clutch.

As shown in Fig. 3, when the clutch members are operating in a counter-clockwise direction and the speed of member 31 is sufficient to completely overcome the tension of springs 45, the aperture 53 as it approaches the extension 47 on member 31 will move over the receding face 48 of said extension, and the member 40 in such case will not be operative for locking the members 30 and 31 together.

In this connection it will be understood that the member 30 rotates at a higher speed than the member 31 until centrifugal force is operative for overcoming the tension of springs 45 and forcing the extension 47 of member 40 into the aperture 53 of member 30 when the members 30 and 31 are approximately synchronized.

As shown in Fig. 4, the centrifugal force has been sufficient to partially project the extension 47 into the aperture 53 of member 30, but in the continued rotation of the member 30 at a higher speed than that of member 31 the rear marginal portion of the aperture 53 will frictionally engage the receding surface 48 of the extension 47 and will cam the member 40 inwardly of the flange 38, thus preventing the locking of the members together.

As shown in Fig. 5, however, centrifugal force has been sufficient to overcome the tension of springs 45 to thrust the extension 47 into the aperture 53 as the speeds of members 30 and 31 have been synchronized.

The shift collar 27 is provided with teeth or splines 54 which are annularly arranged on the outer end thereof for selective engagement with similar teeth or splines 55 internally formed on the member 31. The gear 8 likewise has an internal set of splines 56 corresponding in size to the splines 55 on member 31 and the splines 54 on the collar 27 so that the splines 54 may be selectively connected with the gear 8 and member 31. Thus the collar 27 has four separate positions on the driven shaft 3 as follows: Neutral position with respect to gears 8 and 10 and clutch member 31; automatic intermediate position for establishing operative connection between the intermediate gear 10 and clutch member 31; positive intermediate driving position for establishing positive driving connection between shaft 3 and gear 10; and positive direct driving position for establishing a positive driving connection between shaft 3 and gear 8 in order.

As shown in Fig. 1, the shift collar 27 is in neutral position so that when power is applied to shaft 2 from the motor gears 8, 9, 11, 13, 14 and 10, counter-shaft 7 and clutch member 30 will be continuously rotated, while shaft 3, collar 27, clutch member 31 and gear 12 will remain stationary. When the shift lever 17 is operated for initially applying power to driven shaft 3, gear 12, thru its connection with shift rod 15, is moved to the left, as seen in Fig. 1, into mesh with the driving pinion 13, thus establishing a low gear connection.

As the movement of the car is accelerated, as in other types of transmission, the movement of lever 17 to automatic intermediate position shifts the collar 27 to the right, as seen in Fig. 1, so that the splines 28 on said collar will mesh with the internal splines 23 on the ring 24 associated with intermediate gear 10, and simultaneously splines 54 on the other end of said collar will be meshed with the splines 55 on clutch member 31. Simultaneously therewith gear 12 is shifted to the right and out of mesh with the low gear driving pinion 13. Thus motion is imparted from intermediate driving pinion 11 on shaft 7 to the intermediate driven gear 10 which is loosely mounted on shaft 3, and power is applied thru the roller clutch 26 to the driven ring 24, and thence thru the splines 28 to collar 27, and finally thru the splines 54 and 55 to the driven clutch member 31. Accordingly clutch member 31 will rotate synchronously with intermediate gear 10 and ring 24 and shaft 3, while collar 27 is in automatic intermediate position.

As the car is further accelerated the centrifugally operable locking members 40 on clutch member 31 are extended outwardly in the direction of the periphery of said clutch member against the tension of springs 45 when a predetermined rate of speed has been attained by the clutch member 31 and associated parts. As the speed of the driven member 31 approaches synchronism with the driving member 30 the locking members 40 tend to operatively engage the member 30 and as soon thereafter as the recess 53 in the rim of member 30 is brought into registration with the extensions 47 on said locking members, said extensions will be thrust into the recesses 53 and thereafter the oncoming end of the recesses 53 will engage the rearmost beveled edges 51 of said extensions and will thus serve to positively lock the members 30 and 31 together for synchronous rotation.

The members 30 and 31 will continue to rotate synchronously in inter-locked relation so long as the centrifugal force generated by the speed of the member 31 is sufficient to overcome the tension of the springs 45 which oppose centrifugal force.

Moreover, the beveled edges 51 of extensions 47 tend to prevent the disengagement of the locking members 40 with member 30 until the speed of the member 31 has been more than slightly reduced. As shown in Fig. 4, when the centrifugal force generated by the rotation of member 31 is not quite sufficient to extend the members 40 into locking relation with the member 30, the rim 38 of member 30 will cam over the receding faces 48 of the extensions 47, thereby preventing locking engagement until approximate synchronism between members 30 and 31 has been attained or a predetermined speed of member 31 has been reached. Otherwise, as shown in Fig. 3, the members 47 will be held within the rim 38 of member 30.

When the clutch members 30 and 31 are operatively connected the speed of the ring 24 will be synchronous with the clutch 1 and said ring will necessarily rotate at a higher rate of speed than the gear 10 which is positively driven from shaft 2. In such case the roller clutch 26 permits this differentiation in speed between gear 10 and ring 24. Also, when the members 30 and 31 are engaged as described, a free wheeling action is imparted thru the clutch 1 with respect to the driving gear 8 by means of the roller cluch 34 connecting gear 8 and clutch member 30.

Therefore, when a car is coasting and the speed of shaft 3 is accelerated beyond the speed of shaft 2, the clutch 34 will permit the clutch member 30 to rotate at a speed in excess of shaft 2. A further movement of lever 17 forwardly and shift rod 16 rearwardly will correspondingly move collar 27 to the right, as seen in Fig. 1, so as to engage the splines 28 on said collar with the splines 22 on gear 10, thus establishing a positive driving connection between shaft 2 and gear 10 so that power in such case is applied from shaft 2 thru gears 8 and 9, counter-shaft 7, and gears 11 and 10 to the driven shaft 3.

It will be understood in this connection that gear 10 is loosely mounted on shaft 3.

Automatic free wheeling high gear connections, it will be understood, are established as hereinbefore described when lever 17 is in automatic intermediate position by operatively connecting the ring 24 of gear 10 with clutch member 31 thru collar 27. In such case the clutch member 31 is driven from the gear 10 thru collar 27 until the member 31 attains a predetermined speed, and shaft 3 is driven thru gear 10, ring 24 and collar 27.

When the clutch members 30 and 31 are operatively engaged, however, power is applied from shaft 2 to shaft 3 thru gear 8, clutch 1 and collar 27.

When lever 17 is shifted to positive high or direct drive position the collar 27 is moved to the left, as seen in Fig. 1, until the splines 54 on said collar operatively engage the splines 56 on gear 8, thereby applying power from shaft 2 thru gear 8 and collar 27 to shaft 3.

Attention is particularly called to the form of the extensions 47 on locking members 40 which provides for three important functions of the clutch as follows: First, the receding faces 48 operate to prevent engagement of the locking members with the clutch member 31 so long as the driving member 31 is rotating at a speed in excess of the speed of the driven member. Second, the beveled edge portion 50 locks against the left hand end of recess 53, as said recess is shown in Fig. 4, so as to tend to lock the members 40 in operative position whenever the driven member 31 tends to rotate at a speed in excess of the speed of the driving member 30, as in the case of free wheeling. Third, the beveled edge portion 51 of the locking members 40, which operates to drive the member 31 from the member 30 and prevents the members 40 from unlocking when the speed of the driven member 31 is decelerated but slightly from a normally operative speed.

The clutch 1 may be modified in form for operatively and direct-connecting two coaxial shafts corresponding to shafts 2 and 3 without employing the gear 8 and collar 27, as indicated in my pending application for patent for clutches, filed April 13, 1931, Ser. No. 529,666. Also, the arrangement of the transmission mechanism shown in Fig. 1 is not material to my present invention insofar as the type of transmission therein shown is concerned, for the reason that the clutch 1 may be employed in any standard type of transmission with or without the automatic features shown and described herein.

What I claim is:

1. A transmission mechanism comprising driving and driven shafts, a clutch for operatively connecting said shafts including driving and driven members operatively associated with said shafts, respectively, a counter-shaft, a train of gears connecting said driving and driven shafts around said clutch with said counter-shaft for continuously and positively driving said driven shaft, a stop on said driving clutch member, a positive lock carried on said driven clutch member, and operable responsive to centrifugal force for engagement with said stop on said driving clutch member when the driven clutch member is rotated at a predetermined speed, and means operable during such time as relative rotation exists between said clutch members and acting on said lock for holding the same out of operative engagement with said stop until said clutch members are brought to an approximately synchronous speed.

2. A transmission mechanism comprising driving and driven shafts, a clutch for operatively connecting said shafts including driving and driven members operatively associated with said shafts, respectively, a counter-shaft, a train of gears connecting said driving and driven shafts around said clutch with said counter-shaft for continuously and positively driving said driven shaft, a stop on said driving clutch member, a positive lock carried on said driven clutch member and operable responsive to centrifugal force for engagement with said stop on said driving clutch member when the driven clutch member is rotated at a predetermined speed, means acting on said lock for holding the same out of operative engagement with said stop until said clutch members are brought to an approximately synchronous speed, and an overrunning clutch operatively disposed between said driving clutch member and said driving shaft, whereby the driving and driven clutch members when locked together may rotate at a speed in excess of the speed of the driving shaft.

3. A transmission mechanism comprising driving and driven shafts, a clutch for operatively connecting said shafts including driving and driven members operatively associated with said shafts, respectively, a counter-shaft, a train of gears connecting said driving and driven shafts around said clutch with said counter-shaft for continuously and positively driving said driven shaft, a stop on said driving clutch member, a positive lock carried on said driven clutch member and operable responsive to centrifugal force for engagement with said stop on said driving clutch member when the driven clutch member is rotated at a predetermined speed, means acting on said lock for holding the same out of operative engagement with said stop until said clutch members are brought to an approximately synchronous speed, and shiftable means on said driven shaft for connecting said driven clutch member with and disconnecting the same from said driven shaft.

4. A transmission mechanism comprising driving and driven shafts, a clutch operatively connecting said shafts including driving and driven members operatively associated with said shafts, respectively, a counter-shaft, a train of gears connecting said driving and driven shafts around said clutch with said counter-shaft for continuously and positively driving said driven shaft, a stop on said driving clutch member, a positive lock carried on said driven clutch member and operable responsive to centrifugal force for engagement with said stop on said driving clutch member when the driven clutch member is rotated at a predetermined speed, means acting on said lock for holding the same out of operative engagement with said stop until said clutch members are brought to an approximately synchronous speed, an overrunning clutch connecting said driving clutch member with said driving shaft, whereby the driving and driven clutch members when locked together may rotate at a speed in excess of the speed of the driving shaft, and shiftable means on said driven shaft for connecting said driven clutch member with and disconnecting the same from said driven shaft.

5. A transmission mechanism comprising axially alined driving and driven shafts, gearing on and connecting said driving and driven shafts for positively driving the driven shaft, and including a clutch interposed between the gears on said driving and driven shafts including driving and driven members operatively associated with said driving and driven shafts, respectively, a centrifugally operable positive locking member carried by the driven clutch member for engagement with a portion of the driving clutch member when the driven clutch member is rotated at a predetermined speed, and an overrunning clutch connecting said driving clutch member with said driving shaft, whereby the driving and driven clutch members when locked together may rotate at a speed in excess of the speed of the driving shaft.

6. A transmission mechanism comprising axially alined driving and driven shafts, a counter-shaft, gearing on and connecting said driving and driven shafts with said counter-shaft for positively driving the driven shaft, a clutch interposed between the gears on said driving and driven shafts including driving and driven members operatively associated with said driving and driven shafts, respectively, a centrifugally operable positive locking member carried by the driven clutch member for engagement with a portion of the driving clutch member when the driven clutch member is rotated at a predetermined speed, and shiftable means on said driven shaft for connecting said driven clutch member with and disconnecting the same from said driven shaft.

7. A transmission mechanism comprising axially alined driving and driven shafts, a counter-shaft, gearing on and connecting said driving and driven shafts with said counter-shaft for positively driving the driven shaft, a clutch interposed between the gears on said driving and driven shafts including driving and driven members operatively associated with said driving and driven shafts, respectively, a centrifugally operable positive locking member carried by the driven clutch member for engagement with a portion of the driving clutch member when the driven clutch member is rotated at a predetermined speed, an overrunning clutch connecting said driving clutch member with said driving shaft, whereby the driving and driven clutch members when locked together may rotate at a speed in excess of the speed of the driving shaft, and shiftable means on said driven shaft for connecting said driven clutch member with and disconnecting the same from said driven shaft.

8. A transmission mechanism comprising coaxially mounted driving and driven shafts, a clutch for operatively connecting said shafts, including a driving member connected with the driving shaft and a driven member operatively associated with the driven shaft, a stop on said driving member, centrifugally operable locking members supported on said driven clutch member for positive locking connection with said stop on said driving clutch member when the driven clutch member is rotated at a predetermined speed, means acting on said locking members for holding the same out of operative engagement with said stop until said clutch members are brought to an approximately synchronous speed, an overrunning clutch connecting said driving clutch member with said driving shaft for driving said driving clutch member but permitting the rotation of the driving and driven clutch members at a speed in excess of the speed of the driving shaft, and means providing a one-way driving connection between said shafts and around said clutch for initiating the rotation of said driven shaft.

9. A transmission mechanism comprising driving and driven shafts, a clutch operatively connecting said shafts including driving and driven members operatively associated with said shafts, respectively, a counter-shaft, a train of gears connecting said driving and driven shafts around said clutch with said counter-shaft for continuously and positively driving said driven shaft, a positive lock carried on said driven clutch member for engagement with said driving clutch member when the driven clutch member is rotated at a predetermined speed, said lock embodying a member extensible on the driven clutch member to locking position with respect to the driving clutch member and having an arcuate peripheral portion eccentric relative to the axis of said driven clutch member and receding from the adjacent periphery of the driving clutch member in a direction opposite to the direction of rotation of the driving clutch member, said driving clutch member having means thereon for receiving said lock when the same is thrust outwardly beyond the periphery of the driven clutch member, whereby the driving and driven clutch members may be locked together for rotation.

10. A transmission mechanism comprising driving and driven shafts, a clutch for operatively connecting said shafts including driving and driven members operatively associated with said shafts, respectively, a counter-shaft, a chain of gears connected said driving and driven shafts around said clutch with said counter-shaft for continuously and positively driving said driven shaft, a positive lock carried on said driven clutch member for engagement with said driving clutch member when the driven clutch member is rotated at a predetermined speed, said lock embodying a member extensible on the driven clutch member to locking position with respect to the driving clutch member and having an arcuate peripheral portion eccentric relative to the axis of said driven clutch member and receding from the adjacent periphery of the driving clutch member in a direction opposite to the direction of rotation of the driving clutch member, said driving clutch member having means thereon for receiving said lock when the same is thrust outwardly beyond the periphery of the driven clutch member, whereby the driving and driven clutch members may be locked together for rotation, said lock having inwardly beveled portions at the opposite extremities of said arcuate portion for engagement with corresponding portions of the driving clutch member whereby to prevent the disengagement of said lock from the driving clutch member until the speed of the driven clutch member exceeds that of the driving clutch member.

11. A transmission mechanism having in combination driving and driven shafts, a clutch formed with concentric driving and driven members operatively associated with said shafts, respectively, said driven member nested within said driving member, a lock extensibly mounted on said driven member for engagement with said driving member, means opposing contrifugal force for urging said lock into inoperative position, said lock having an extension with a periphery receding from one to the other extremity thereof and in a direction opposite to the direction of rotation of said driving member, and inwardly beveled portions at the opposite extremities of said extension, said driving member having spaced portions on its periphery between which said extension is adapted to be thrust when the driven member attains a predetermined speed, whereby said driving and driven members will be positively locked together for simultaneous rotation, for the purpose described, and means providing a one-way driving connection between said shafts and around said clutch for initiating the rotation of said driven shaft.

12. A transmission mechanism comprising a driving shaft, a driving member, a one-way clutch adapted to connect said shaft and said driving member, said driving member being adapted to over-run said shaft, a driven member, centrifugally operated means carried by one of said members operable to lock said members together when they are in synchronism and have first attained a predetermined speed, and means providing a one-way driving connection between said driving shaft and said driven member and around said one-way clutch for initiating the rotation of said driven member.

13. A transmission mechanism comprising a driving shaft, a driving member, a one-way clutch adapted to connect said shaft and said driving member, said driving member being adapted to over-run said shaft, a driven member having a portion in telescoped relation to said driving member, means operable at a predetermined speed to connect said driving member and said driven member when said members have attained synchronism, said means comprising centrifugally impelled elements carried by one of said members, and means providing a one-way driving connection between said driving shaft and said driven member and around said one-way clutch for initiating the rotation of said driven member.

14. A transmission mechanism comprising axially alined driving and driven shafts, an overrunning clutch including a driving member and a driven member operatively associated respectively with the driving and driven shafts, means connecting the driving and driven shafts around said overrunning clutch for positively operating the driven shaft in a given direction, a positive lock carried on the driven clutch member for engagement with the driving clutch member when the driven clutch member is rotated at a predetermined speed, and shiftable means on the driven shaft selectively operative for connecting the driven clutch member with the driving shaft and for direct-connecting the driving shaft with the driven shaft independently of said over-running clutch.

15. A transmission mechanism comprising alined driving and driven shafts. means for connecting said shafts for positively driving the driven shaft in a given direction, and including a one-way clutch, and a shiftable member on the driven shaft operative for connecting said clutch with the driven shaft whereby the driven shaft may rotate at a speed in excess of that of the associated connecting means, an over-running clutch on the driving shaft including driving and driven members, and means whereby said shiftable member may be positively connected with the driven member of said over-running clutch when the same is operatively connected with said other clutch, a positive lock on the driven member of said over-running clutch for locking engagement with the driving member of said over-running clutch when the driven shaft attains a predetermined speed, and means rotatable with said driving shaft and selectively engageable with said shiftable member whereby said driven shaft may be direct-connected with said driving shaft around said running clutch.

16. A transmission mechanism comprising alined driving and driven shafts, means connecting said shafts for positively driving the driven shaft in a given direction, and including a one-way clutch, and a shiftable member on the driven shaft operative for connecting said clutch with the driven shaft whereby the driven shaft may rotate at a speed in excess of that of the connecting means, a centrifugally actuated clutch on the driving shaft including driving and driven members, and means whereby said shiftable member may be positively connected with the driven member of said centrifugally actuated clutch when the same is operatively connected with said other clutch, a positive lock on the driven member of said centrifugally actuated clutch for locking engagement with the driving member of said centrifugally actuated clutch when the driven shaft attains a predetermined speed, means for direct-connecting said shiftable member with said driving shaft around said centrifugally actuated clutch, and an overrunning clutch connecting the driving member of said centrifugally actuated clutch with the driving shaft whereby said driving member may be rotated synchronously with the driven member of the centrifugally actuated clutch when the speed of said centrifugally actuated clutch is in excess of that of the driving shaft.

17. In a transmission mechanism having axially aligned driving and driven shafts, means for providing a one-way drive between said shafts, and a clutch operative for providing a drive between said shafts at a higher ratio than said one-way drive and including driving and driven members operatively associated with said shafts, respectively, a stop on said driving member, a positive locking member carried by said driven clutch member and operable responsive to centrifugal force resulting from rotation of said driven clutch member at predetermined rate for locking engagement with said stop on said driving clutch member for driving said driven shaft at an increased speed ratio and means acting on said locking member and operable for holding the same out of operative engagement with said stop until any selected speed above said predetermined rate has been attained.

18. In a transmission mechanism having axially aligned driving and driven shafts, means for providing a one-way drive between said shafts, and a clutch operative for providing a drive between said shafts at a higher ratio than said one-way drive and including driving and driven members operatively associated with said shafts, respectively, a stop on said driving member, and a positive locking member carried by said driven clutch member and operable responsive to centrifugal force resulting from rotation of said driven clutch member and at any speed thereof above a predetermined rate of positive locking engagement with said stop on said driving clutch member for driving said driven shaft at an increased speed ratio, said locking member embodying means for preventing the operation thereof to operatively engage said driving clutch member until the rotative speed thereof is reduced to substantially that of said driven clutch member.

19. In a transmission, the combination with a driving shaft and a driven shaft, means including an overrunning clutch for providing a driving connection between said shafts, an automatic clutch operable for effecting a driving connection between said shafts and at a higher ratio than that provided by said means, said automatic clutch including a member operatively connected to said driving shaft and having a bolt-receiving opening, and a member operatively associated with said driven shaft and having a radially movable bolt operable responsive to centrifugal force resulting from rotation of said driven shaft member and at any speed thereof above a predetermined rate to engage said opening for connecting said clutch members to effect a driving connection therethrough, said bolt being provided with means for preventing the operative engagement thereof with said driving shaft clutch member until the rotative speed thereof is brought to substantially that of said driven shaft clutch member.

20. In a transmission, the combination with a driving shaft and a driven shaft, means including an overrunning clutch for providing a driving connection between said shafts, an automatic clutch operable for effecting a driving connection between said shafts and at a higher ratio than that provided by said means, said automatic clutch including a member operatively connected to said driving shaft and having a bolt-receiving opening, a member operatively associated with said driven shaft and having a radially movable bolt operable responsive to centrifugal force resulting from rotation of said driven shaft member and at any speed thereof above a predetermined rate to engage said opening for connecting said clutch members to effect a driving connection therethrough, said bolt being provided with means for preventing the operative engagement thereof with said driving shaft clutch member until the rotative speed thereof is brought to substantially that of said driven shaft clutch member, resilient means normally restraining said bolt against radial movement to engage said driving member and operable for breaking the driving connection between said shafts and through said members, and means resisting the operation of said resilient means to move said bolt out of engagement with said opening until the speed of said driven shaft member is substantially less than said predetermined rate.

21. In a transmission, the combination with driving and driven shafts, of means affording an initial fixed ratio driving connection between said shafts, a centrifugally actuated clutch operable for effecting a driving connection between said shafts at a higher ratio than that afforded by said means, said centrifugally actuated clutch including a member operatively associated with one of said shafts and having a bolt-receiving opening, a member operatively associated with the other of said shafts and carrying a movable bolt operable responsive to centrifugal force to extend into said opening for connecting said clutch members to effect a driving connection between said shafts therethrough, means for holding said bolt against movement toward said opening until said driven shaft attains a predetermined speed, said clutch members being rotated at different rates at such times as said driven shaft is being driven through said first named means, said bolt being adapted to bear against the surface of said member in which said opening is provided when said driven shaft is rotating at a rate above said predetermined speed and having a cam surface cooperable with said opening for preventing the movement of said bolt into said opening until said members have been brought to an approximately synchronous speed, said surface being formed to recede from the surface of said member against which the same bears in a direction reversely of the relative direction of the rotation of the said last mentioned member during such time as said members are rotating at different rates.

22. In a transmission, the combination with driving and driven shafts, of means affording an initial fixed ratio driving connection between said shafts, a centrifugally actuated clutch operable for effecting a driving connection between said shafts at a higher ratio than that afforded by said means, said centrifugally actuated clutch including a member operatively associated with one of said shafts and having a bolt-receiving opening, a member operatively associated with the other of said shafts and carrying a movable bolt operable responsive to centrifugal force to extend into said opening for connecting said clutch members to erect a driving connection between said shafts therethrough, means for holding said bolt against movement toward said opening until said driven shaft attains a predetermined speed, said clutch members being rotated at different rates at such times as said driven shaft is being driven through said first-named means, said bolt being adapted to bear against the surface of said member in which said opening is provided when said driven shaft is rotating at a rate above said predetermined speed and having a cam surface cooperable with said opening for preventing the movement of said bolt thereinto until said members have been brought to an approximately synchronous speed, said cam surface of said bolt being formed eccentric with respect to the axis of rotation of the member by which said bolt is carried.

23. In a transmission, the combination with driving and driven shafts, of means affording an initial fixed ratio driving connection between said shafts, a centrifugally actuated clutch operable for effecting a driving connection between said shafts at a higher ratio than that afforded by said means, said centrifugally actuated clutch including a member operatively associated with one of said shafts and having a bolt-receiving opening, a member operatively associated with the other of said shafts and carrying a movable bolt operable responsive to centrifugal force to extend into said opening for connecting said clutch members to effect a driving connection between said shafts therethrough, means for holding said bolt against movement toward said opening until said driving shaft attains a predetermined speed, said clutch members being rotated at different rates at such times as said driven shaft is being driven through said first-named means, said bolt being adapted to bear against the surface of said member in which said opening is provided when said driven shaft is rotating at a rate above said predetermined speed and having a surface cooperable with said opening for preventing the movement of said bolt into said opening until said members have been brought to an approximately synchronous speed, said bolt surface including a cam face the portion thereon on one side of the center line of said bolt being disposed closer to the surface of said member in which said opening is provided than that portion of said bolt on the opposite side of the center line thereof at such time as said members are rotating at different rates and above said predetermined speed.

REX E. KELLER.